K. H. C. Preston.
Harvester Dropper.

No. 69838.  Patented Oct. 15, 1867.

Witnesses:
Theo Tuck
J. A. Servou

Inventor:
K. H. C. Preston
Per Munn & Co
Attorneys

UNITED STATES PATENT OFFICE.

K. H. C. PRESTON, OF MANLIUS, NEW YORK.

IMPROVEMENT IN HARVESTERS.

Specification forming part of Letters Patent No. 69,838, dated October 15, 1867.

*To all whom it may concern:*

Be it known that I, K. H. C. PRESTON, of Manlius, in the county of Onondaga and State of New York, have invented a new and Improved Grain-Discharging Device for Reapers; and I do hereby declare that the following is a full, clear, and exact description thereof, which will enable others skilled in the art to make and use the same, reference being had to the accompanying drawings, forming part of this specification, in which—

Figure 1:
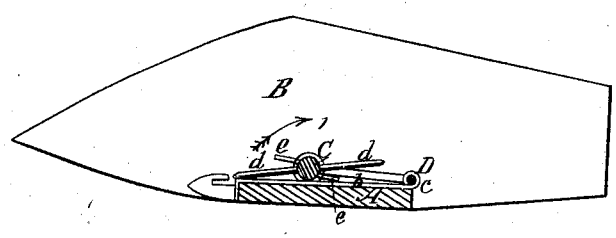
Figure 2:
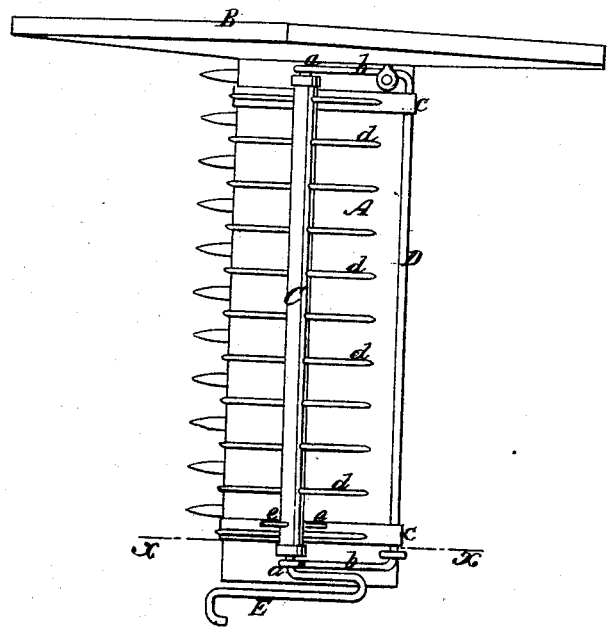

Figure 1 is a transverse vertical section of my invention, taken in the line $x\ x$, Fig. 2; Fig. 2, a plan or top view of the same.

Similar letters of reference indicate like parts.

This invention consists of a revolving or semi-revolving toothed head or shaft applied to the platform of a reaper in such a manner that it will receive the grain as it is cut, and, when a sufficient quantity of grain has been deposited upon it, be capable, by a semi-revolution, of discharging the grain from the platform without the liability of becoming choked or clogged, and without tangling the grain.

A represents the platform of a reaper, and B the wing or track-clearer, attached to the outer end thereof. These parts may be constructed in the usual manner, and therefore do not require a minute description.

C represents a shaft, which may be constructed of wood, and having its journals or ends fitted loosely in eyes $a$ at the ends of arms $b$ of a shaft, D, the latter having its bearings $c$ at or near the rear edge of the platform A. The shaft D is allowed to turn freely in its bearings $c$, and the inner end of the shaft C has a crank or lever, E, attached to it, so arranged as to be within convenient reach of the driver; or, instead of this lever, an automatic mechanism may be attached or applied, to admit of said shaft being operated from the driving-wheels of the machine.

The shaft C has a series of teeth, $d$, passing through it at right angles, and at suitable and equal distances apart. These teeth project at equal distances from the shaft, at opposite sides of it, as shown in Fig. 2; and the shaft has two short arms, $e\ e$, projecting from it a opposite sides, said arms giving the teeth $d$, when the shaft C is at rest upon the platform, a slightly-inclined position from a horizontal plane, as shown in Fig. 1.

The cut grain falls upon the teeth $d$ and shaft C, and the usual reel may be employed for throwing the cut grain upon the teeth and shaft. When a requisite quantity of grain has been deposited upon the teeth and shaft C, the latter is turned one-half of a revolution in the direction indicated by arrow 1, and the grain discharged at the rear of the platform—A; and the cut grain which is being discharged is separated from that which is falling over the platform, the portion of the teeth at the under side of the shaft coming forward and passing under the falling grain.

It will be seen from the above description that as the shaft C is turned it will rise, in consequence of the rear ends of the teeth coming in contact with the platform, and pass to the front edge thereof. This raising of the shaft C renders the device very efficient in throwing or casting the cut grain from the platform.

If necessary or desired, the end teeth, $d$, of the shaft C may have friction-rollers inserted in their ends, to facilitate the passage of the teeth over the platform when the device is turned half a revolution to discharge the cut grain from the platform.

Having thus described my invention, I claim as new and desire to secure by Letters Patent—

The shaft D, having bearings $c$ at or near the rear of the platform A, its arms $b$ provided with eyes $a$, supporting the shaft C, having at one end the crank E, and provided with the teeth $d$ and $e$, all arranged and operating as described, for the purpose specified.

K. H. C. PRESTON.

Witnesses:
JAS. A. SERVICE,
WM. DEAN OVERELL.